Aug. 13, 1929.  B. F. KELLY  1,724,204
PROCESS OF SILVERING AND BEVELING SMALL MIRRORS
Filed May 14, 1928  2 Sheets-Sheet 1
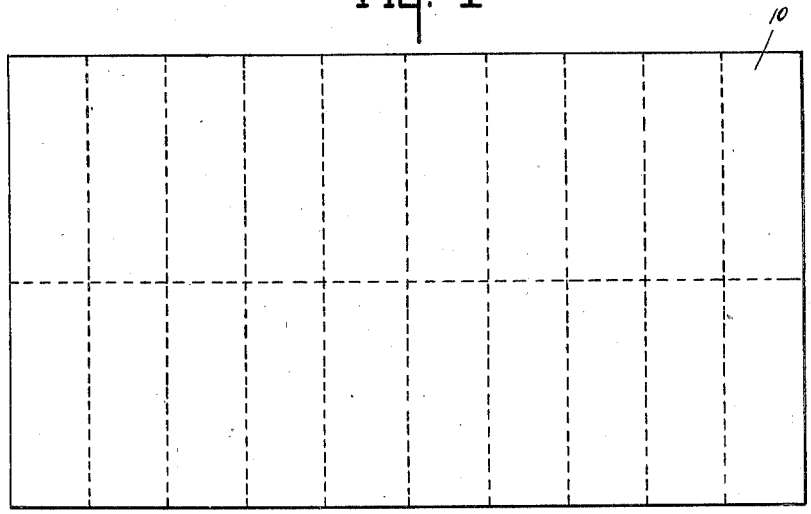
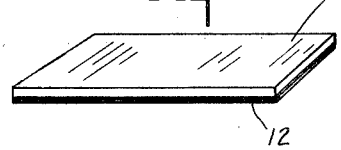
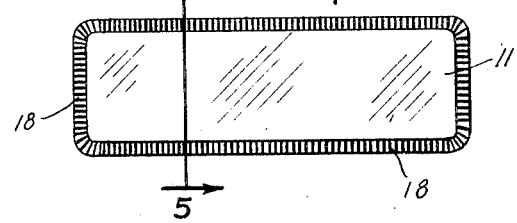
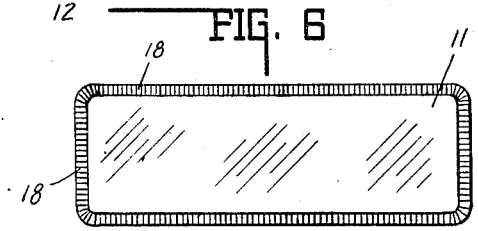
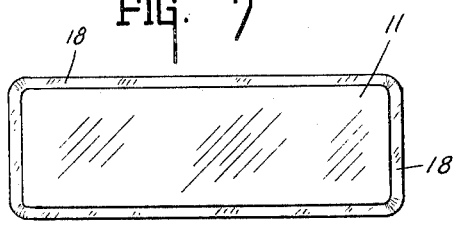
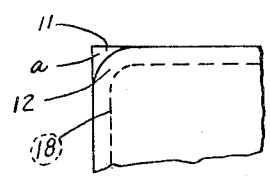
INVENTOR.
BERT F. KELLY.
BY
ATTORNEYS.

Aug. 13, 1929.  B. F. KELLY  1,724,204
PROCESS OF SILVERING AND BEVELING SMALL MIRRORS
Filed May 14, 1928   2 Sheets-Sheet 2
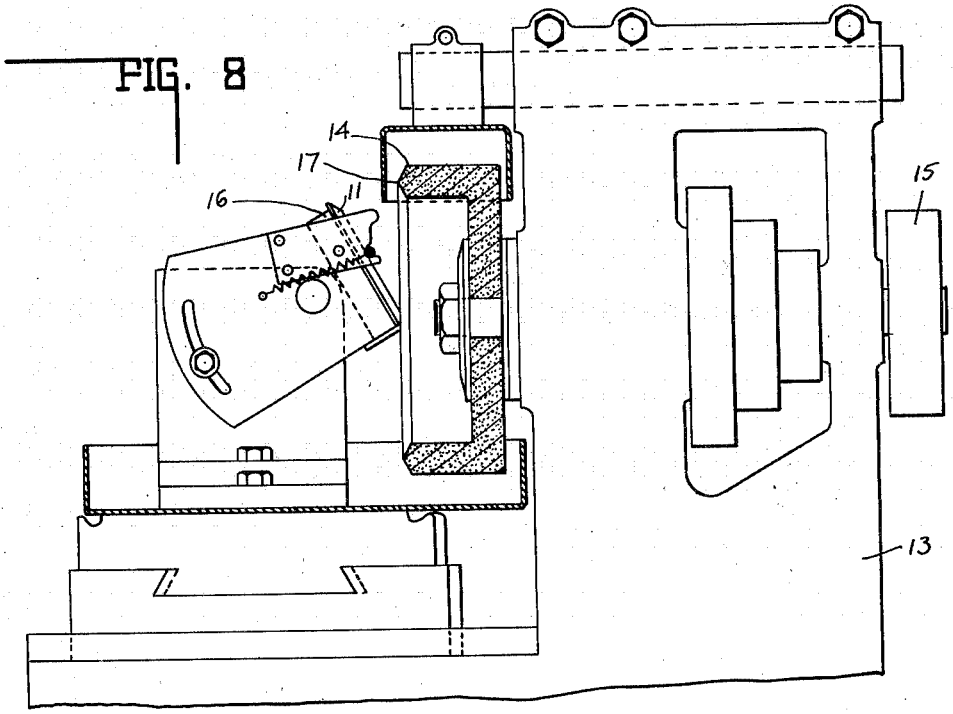
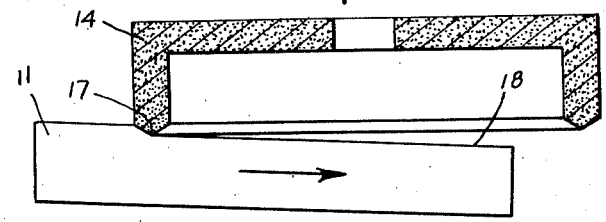
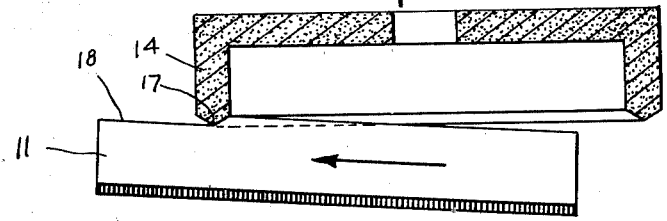
INVENTOR.
BERT F. KELLY.
BY
ATTORNEYS.

Patented Aug. 13, 1929.  1,724,204

UNITED STATES PATENT OFFICE.

BERT F. KELLY, OF INDIANAPOLIS, INDIANA.

PROCESS OF SILVERING AND BEVELING SMALL MIRRORS.

Application filed May 14, 1928. Serial No. 277,713.

This invention pertains to a new process of manufacturing small beveled mirrors, particularly used as rear view mirrors for automobiles.

Heretofore in practice, it has been customary to grind and polish the beveled edge of the mirror by hand before it is silvered, the operator holding the mirror at an angle against the surface of the emery wheel or roughing wheel. It is necessary to bevel or edge the glass in this manner before silvering in order that the operator may see through it for obtaining the proper bevel. The smoothing pumice and polishing processes are similarly carried on necessarily before the mirror is silvered for the same reason. This necessitates the silvering of small pieces of glass which is wasteful.

It is the object of this invention to not only mechanically bevel or edge the glass, but to effect an appreciable saving in the cost of production of small mirrors of this character by first silvering and "backing" a large plate of glass from which a number of smaller mirrors may be cut. A considerable saving is thus effected by reason of the fact that it is substantially as costly to silver a small piece of glass as it is to silver a large piece owing to the nature of the labor involved and the drying period. By the new process, assuming that a large piece of glass containing twenty small pieces is first silvered, twenty small mirrors can be silvered at substantially the cost of a single small mirror by the old process. This enables production under the new process to be increased nearly twenty times over what it was in the old process so far as the silvering operation is concerned, reference being had to Letters Patent No. 1,664,300 issued to me March 27, 1928.

The principal feature of the invention resides in the process of beveling the edges of the small silvered mirrors and rounding the corners thereof after the same have been silvered as above set forth. It is well known that silver will oxidize after it comes in contact with moisture, and also it will be understood that it is essential in the beveling operation to supply a small amount of water to the grinding element and glass for reducing the heat. This process, therefore, contemplates the production of the mirrors by first silvering a large piece and then cutting it into smaller pieces, and thereafter protecting the silver against oxidization during the grinding process, as will be hereafter more fully set forth and described.

The full nature of the invention will be understood from the accompanying drawings and the following description and claims.

In Fig. 1 there is shown a large plate of glass from which a plurality of mirrors are cut as indicated by dotted lines. Fig. 2 is a side elevation thereof showing the silvering and "backing" thereon. Fig. 3 is a perspective view of one of the small mirrors cut therefrom. Fig. 4 is a plan view of a small mirror with the bevel cut therefrom by the first operation. Fig. 5 is a section taken on the line 5—5 of Fig. 4. Fig. 6 is the same as Fig. 4 showing the bevel upon being smoothed. Fig. 7 shows the bevel upon being polished. Fig. 8 shows an elevation of the cutting or rough grinding machine with a section taken through the grinding wheel. Fig. 9 is an enlarged view illustrating the grinding with respect to the mirror when moving in the direction of the arrow. Fig. 10 is the same as Fig. 9 showing the same action when moving in the reverse direction. Fig. 11 illustrates a portion of a mirror showing the corner thereof "back edged."

The process consists in first taking a piece of glass 10 of dimensions that are multiples of the desired dimensions of the small mirrors to be made therefrom. As shown herein, there is a plate glass 25-inches in length and 14-inches in width from which twenty mirrors 11 may be cut 2½-inches in width and 7-inches in length. The plate glass 10 is first silvered in accordance with the usual process so as to provide a silvered backing 12. Inasmuch as the operations in the silvering process must be gone through with regardless of the size of the glass, after which it must remain on the drying table for a period of time, it is obvious that an operator can silver a plate of glass of comparatively large dimensions as well as a smaller piece in the same time, and since the glass must be first rinsed with the silvering solution which is then wasted, it takes little more silvering solution for a large piece then it does for a small piece. Thus an operator with the same equipment can silver the glass 10 in the same time that he can silver the glass 11, and as twenty pieces 11 may be obtained from the silvered piece 10, it is obvious that there will be considerable saving in time and material.

After the glass has been silvered and cut into the desired size the corners are "back edged," or in other words a portion of the silver is ground off far enough back from the corners so that when the corners are rounded the silver will not be disturbed or come into contact with the water, as indicated at a in Fig. 11. Thereupon a coat of chalky paint-like substance containing no oil and which does not affect the silver, is applied to the corners and along the edges of the mirror. After the same has dried a coat of water proof paint is applied at the corners and edges so as to keep out the moisture and protect the silver therefrom.

The mirror thus treated is thereupon pressed to the grinding element for grinding away and beveling the corners and edges. For this purpose there is shown in Fig. 8 a machine which comprises the usual pedestal 13, a power driven manufactured "cup" grinding wheel 14 driven by suitable power through the pulley 15. Mounted on the machine there is a transversely traveling carriage 16 for receiving the glass plate 11 and feeding it against one edge of the wheel 14 as illustrated in Figs. 9 and 10. The glass is then caused to travel in the direction of the arrow as shown in Fig. 9 transversely so as to cause the wheel to cut off the entire bevel during a single passage of the glass. The glass is then reversed on the table 11 and passed back in the direction of the arrow shown in Fig. 10 so that the opposite side of the glass will be similarly beveled. The end edges are treated in the same manner as shown and described with respect to the side edges.

If it is desired to have a ground finish on the bevel, or a clear and polished finish, the glass may then be placed in a suitable carriage which will hold it at the desired angle against a smoothing grinder of the usual character, the only difference being that whereas such bevels heretofore have been held against such grinder by hand, they are herein accurately positioned by the carriage so that it is not necessary for a skilled operator to look through an unsilvered piece of glass in order to obtain the desired results. If it is further desired that the bevel be of a polished finish, it may then in the same manner be applied to a polishing grinder.

From the above it will be apparent that not only a very appreciable saving is made in the cost of silvering the glass, but the bevel edge of the glass may be ground to accurate limits and positive duplication of parts, as well as obtaining rapid production, uniform and neat appearance in the finish.

It will be noted that the transverse ribs 18 formed on the beveled surface while appearing to be straight, are in reality an arc equal to the circumference of the cup grinding wheel 14 and spaced from each other in accordance with the traveling speed of the carriage 16.

The invention claimed is:

1. The process of manufacturing beveled mirrors from silvered sheets of glass consisting in water proofing the edges thereof for protecting the silver, and thereafter mechanically grinding the edges to the desired bevel.

2. The process of manufacturing mirrors from silvered sheets of glass consisting in removing from the corners thereof a portion of the silver, applying to said corners and edges a water proofing paint and thereafter rounding said corners and beveling the edges.

3. The process of manufacturing mirrors from silvered sheets of glass consisting in applying to the corners and edges thereof a coating of chalk-like paint containing no oil, thereafter applying a coat of water proofed paint, and upon the drying thereof mechanically grinding the corners and edges so as to be properly rounded and beveled.

4. The process of manufacturing mirrors from silvered sheets of glass consisting in back edging the corners thereof by removing a portion of the silver to the extent that the corners are to be rounded, applying thereto a chalk-like paint containing no oil and thereafter applying a water proofed paint to the corners and edges and then grinding the same to produce the desired rounded corners and beveled edges.

In witness whereof, I have hereunto affixed my signature.

BERT F. KELLY.